United States Patent [19]

Andersen

[11] Patent Number: 4,476,283

[45] Date of Patent: Oct. 9, 1984

[54] GRAFT COPOLYMERIZATION PROCESS

[75] Inventor: Paul G. Andersen, Southbury, Conn.

[73] Assignee: Uniroyal, Inc., New York, N.Y.

[21] Appl. No.: 441,122

[22] Filed: Nov. 12, 1982

[51] Int. Cl.³ ................. C08G 253/00; C08G 279/00; C08L 51/00; C08L 51/04
[52] U.S. Cl. ....................................... 525/53; 525/75; 525/86; 525/193
[58] Field of Search ...................... 525/53, 75, 86, 193

[56] References Cited

U.S. PATENT DOCUMENTS

| | | | |
|---|---|---|---|
| 3,243,481 | 3/1966 | Ruffing et al. | 525/53 |
| 4,166,081 | 8/1979 | Fournier, Jr. et al. | 525/53 |
| 4,202,948 | 5/1980 | Peascoe | 525/70 |
| 4,314,041 | 2/1982 | Shimokawa et al. | 525/53 |

Primary Examiner—Allan M. Lieberman
Attorney, Agent, or Firm—Bert J. Lewen; James J. Long

[57] ABSTRACT

Mass graft copolymerization carried out in an extrusion passageway having a sealing zone to prevent back flow of grafting material introduced to the extrusion passageway downstream of the sealing zone.

11 Claims, 3 Drawing Figures

Dynamic Seal Schematic

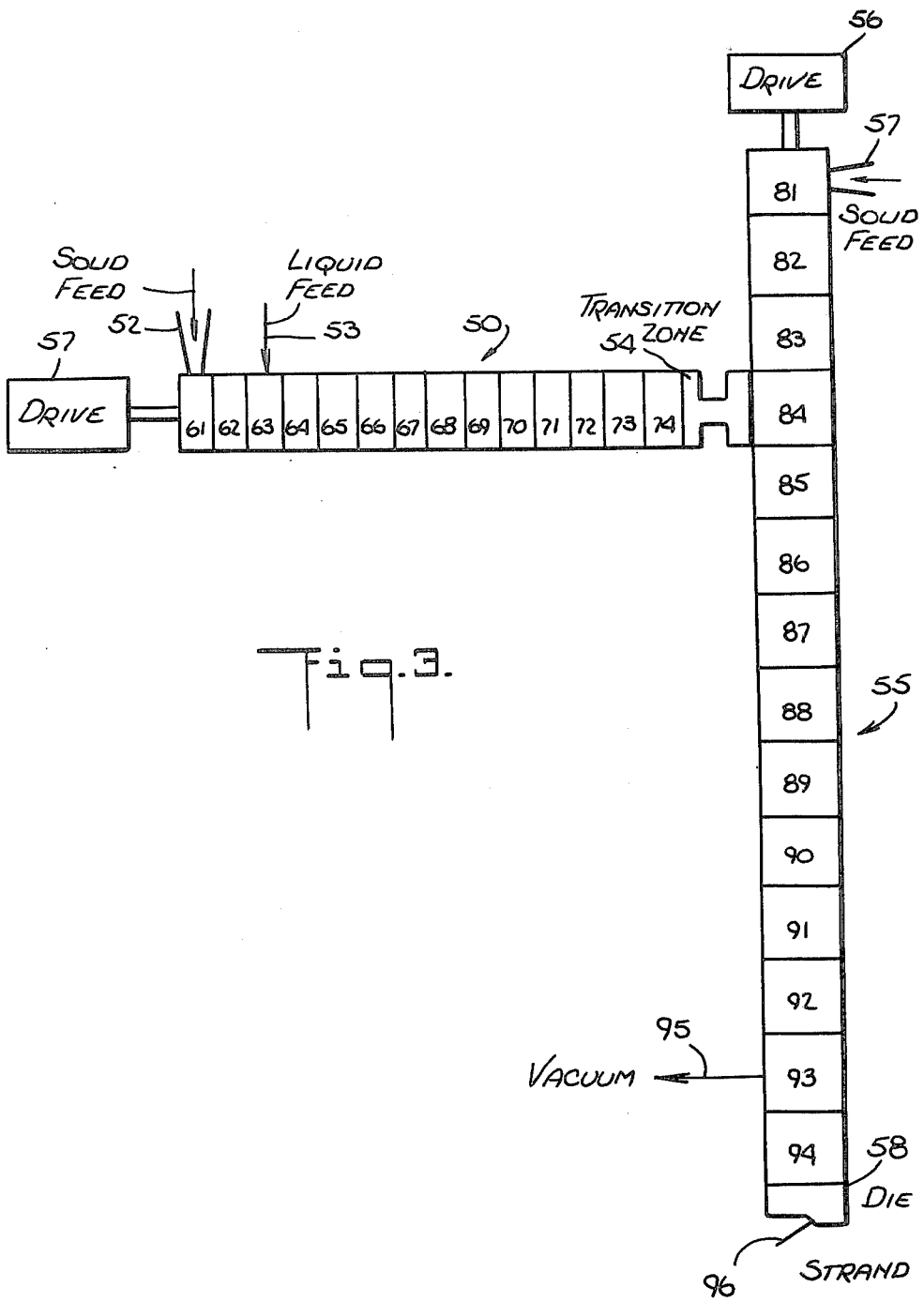

GRAFT COPOLYMERIZATION PROCESS

This invention relates to a graft copolymerization process, and more particularly to a graft copolymerization process carried out while continuously advancing the graft copolymerization mass through an enclosed passageway.

In one aspect, the invention is directed to an improved process for the preparation of AES graft copolymer copositions of the kind described in U.S. Pat. No. 4,202,948, Peascoe, May 13, 1980 based on a graft copolymer of resin-forming monomers (e.g., styrene-acrylonitrile) on EPDM type of rubber (especially a terpolymer of ethylene, propylene and a copolymerizable non-conjugated diene). The several known methods for preparing such graft copolymer compositions suffer from various disadvantages arising largely from the extremely viscous nature of the graft copolymer reaction mass, especially at high conversions and in the absence of solvent or diluent, with consequent limited productivity.

The invention will be described with reference to the accompanying drawings, wherein:

FIG. 3 is a view, similar to FIG. 1, of a modified apparatus embodying two screw extruders arranged in series.

Figure 1:
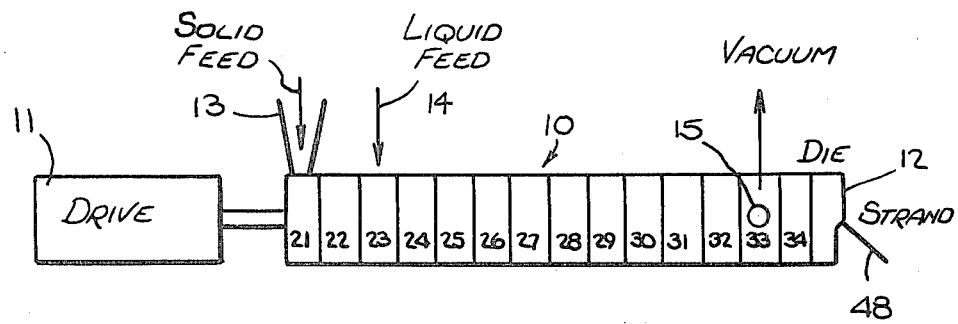
FIG. 1 is a purely diagrammatic elevational view of one extrusion apparatus suitable for carrying out the invention.

In accordance with the invention, a polymer which is to serve as the spine of the graft copolymer is fed continuously into an enclosed passageway, particularly an extrusion passageway wherein the polymer is advanced and worked continuously. The spine polymer is ordinarily an unsaturated material, especially an unsaturated rubber, although saturated polymer may also be used. Various screw extrusion devices are suitable for the present purpose, such as twin screw extruder-mixers.

The invention provides for the introduction of grafting material to the spine polymer in the extrusion passageway. Ordinarily the grafting material to be reacted with the spine polymer is a volatile or gaseous material, such as one or more liquid monomers capable of graft copolymerizing with the spine polymer.

In the process of the invention the spine polymer does not completely fill the extrusion passageway. To prevent the grafting material, which is introduced under pressure downstream of the point of introduction of the spine polymer, from backing up in the extrusion passageway, a sealing zone is established between the point of introduction of the spine polymer and the point of introduction of the grafting material. The sealing zone is established by locally retarding the forward flow of the spine polymer and compacting it so as to completely fill the extrusion passageway with the spine polymer. In effect, a solid plug of spine polymer is thus formed in the sealing zone; the grafting material introduced downstream of the sealing zone cannot move upstream beyond the sealing zone. The grafting material is thus prevented from escaping through the entrance hopper where the spine polymer is initially introduced.

The spine polymer and grafting material are mixed together and advanced through the extrusion passageway by the action of the extruder screws, under graft copolymerization conditions, with the result that a substantial portion of the grafting material becomes graft copolymerized on the spine polymer, forming a graft copolymer mass which is subsequently discharged from the extrusion passageway, ordinarily through a suitable die.

It will be understood that in a typical graft copolymerization process not all of the grafting material actually becomes chemically attached to the spine polymer. That portion of the grafting material which does not graft copolymerize either polymerizes with itself or remains unreacted. The graft copolymer mass is thus typically composed in part of true graft copolymer and partly of polymer formed by polymerization of the grafting monomers with themselves, in addition to unreacted monomer(s).

To remove unreacted grafting materials from the graft copolymer mass, vacuum may be applied to the extrusion passageway prior to the point at which the graft copolymer mass is expelled from the die.

After issuing from the die, for example in the form of a rod or strip, the graft copolymer may be chopped into pellets or otherwise suitably processed for further use, with or without addition of other materials.

In accordance with one practice, the graft copolymer (e.g., an ABS or AES graft copolymer) is blended with further separately prepared resin (e.g., styrene-acrylonitrile resin) under fluxing conditions to produce for example a gum plastic having a continuous resinous phase in which a rubber graft copolymer phase is dispersed. A particularly desirable method for doing this is to pass the graft copolymer mass directly from the above-described extrusion passageway into a second screw extruder mixer directly connected to the first extruder. The second extruder acts analagously to the first extruder, that is, the polymer mass incompletely fills the second extrusion passageway. The additional polymer, typically a resin, is introduced to the second extrusion passageway upstream from the point where the graft polymer is introduced. To prevent volatile material (particularly any residual unreacted monomer in the graft copolymer mass) from backing up in the second extruder, a seal is provided between the point at which graft copolymer is introduced and the point at which the additional resin is introduced. As in the first extruder, the seal takes the form of a solid mass or plug of polymer created in the second extrusion passageway by retarding the flow of polymer and compacting it into a solid mass which completely fills the extrusion passageway in the sealing zone.

In the continuation of the second extrusion passageway downstream from the sealing zone the mixture of graft copolymer and separately prepared resin only partially fills the extrusion passageway. The polymers are kneaded together at elevated temperature (e.g., 100° C. or less to 275° C. or more) under conditions such that continued graft copolymerization and homopolymerization of unreacted monomers takes place. The blend is advanced to an exit die where the mixture is discharged for further processing.

It will be understood that as a result of the grafting reaction the rubber spine polymer becomes compatabilized with the added resinous material. The graft copolymerization mass produced in the first extrusion passageway has a continuous resin phase or a continuous rubber phase, depending on the relative proportions of monomers and rubber, and the degree of conversion of monomers. In the second extrusion passageway the continuous phase may become the discontinuous phase.

Vacuum may be applied to the second extrusion passageway prior to discharge of the blend to remove any unreacted monomers. The discharged product may be used to make useful shaped articles of all sorts by such conventional processes as molding (compression, transfer or injection), calendering, extrusion, laminating, etc.

The process of the invention is applicable to the preparation of graft copolymer on any polymer spine suitable for graft copolymerization. Frequently the spine polymer is an unsaturated polymer, especially an unsaturated rubber, for example EPDM, polybutadiene, SBR, NBR, polyisoprene (natural or synthetic) or the like. Also suitable as spine polymers are saturated materials, as illustrated by such saturated rubbers as EPM. If desired, more than one spine polymer may be used (e.g., a mixture of two or more rubbers). In a preferred practice, a small, effective amount of an antioxidant is added to the spine polymer.

The grafting material may comprise any suitable conventional grafting material which will graft polymerize with the spine polymer employed. Usually the grafting material is a volatile liquid monomer or a gaseous monomer. Particularly useful are such vinyl aromatic monomers as styrene and such alkenoic monomers as alkenoic nitriles, esters and acids, or mixtures of such monomers.

If a separately prepared polymer is blended with the graft copolymer mass, such separate polymer may be for example a resin based on the same monomers as used in the grafting reaction, or a resin based on different monomers.

If desired, the grafting material may be employed in partially polymerized form. For example, a partially polymerized (low conversion) styrene-acrylonitrile copolymer, still containing substantial amounts of unreacted styrene and acrylonitrile, may be used as the grafting material.

The relative proportions of rubber spine and grafting material may vary as in conventional practice, for example from as little as 1 part (by weight) to as much as 99 parts of rubber and correspondingly 99 parts to 1 part of grafting material. In many cases from 30 to 85 parts of monomeric material is employed with correspondingly 70 to 15 parts of rubber. Frequently approximately equal parts of rubber and resin are present in the graft copolymerization mass.

As in conventional practice, the graft copolymerization reaction is brought about by a free-radical polymerization initiator or catalyst employed in a small but effective amount (e.g., from 0.01 to 5 percent by weight of the grafting material). The initiator is conveniently added in admixture with the monomeric charge, although it may also be added separately.

It will be understood that the graft copolymerization is brought about by heating the mass to a temperature sufficiently elevated to decompose or activate the polymerization initiator. A suitable graft copolymerization temperature in any given case will depend largely on the particular initiator employed, as in conventional practice. In many cases a temperature within the range of 100° C. to 275° C. is suitable.

The polymerization initiator is frequently an organic peroxygen compound. A mixture of two or more organic peroxygen compounds may be employed. Particularly suitable are organic peroxide polymerization catalysts which have a half life of at least 5 minutes as determined by the decomposition rate in benzene at 100° C. Some suitable compounds are tert-butyl perbenzoate, tert-butyl hydroperoxide, di-tert-butyl peroxide, benzoyl peroxide, and tert-butyl peroctoate.

It may be desirable to add other material along with the spine or grafting material (e.g., U.V. stabilizer, pigments, etc.)

The time of dwell of the graft copolymerization mass in the extrusion passageway will of course be sufficient to bring about the desired degree of conversion of monomers.

It is desired to emphasize that an important feature of the invention resides in the described dynamic seal which constitutes a one way material seal from a low pressure zone (where the spine polymer is introduced) to a higher pressure zone (where the grafting material is introduced). The dymamic seal keeps the liquid feed (grafting material), which builds up a high pressure after it is injected but before it can be incorporated into the spine rubber, from travelling back to the solids feed port while allowing the solid feed to pass through to the liquid feed. This is achieved by assembling a series of screw elements which counteract this pressure and set up an overall proper pressure gradient between the solid feed and the liquid feed zones. A typical seal is constructed from a number of elements in series comprising first positive pitch kneading elements to provide forwarding pressure, then a neutral kneading element which has neutral pitch and tends to fill up with material. These elements are typically followed by a negative or reversed pitch kneading element which opposes the flow of material from the solids to liquid feed port, then a positive and finally another negative pitch kneading element. The proper balance of positive and negative forces keeps the elements full and material flowing in the appropriate direction. The rest of the screw is constructed in a similar manner to provide a balance of positive and negative elements which overcome any localized pressure buildup to maintain a steady uniform flow of material. Conventional extrusion screw arrangements are suitable for this purpose.

It is also desired to emphasize that another important feature of the invention resides in the lack of need for use of solvents or any non-participating materials in the process which would subsequently have to be removed (e.g., water in the case of an aqueous emulsion process).

Notable advantages of the present process include the following:
1. The process is continuous
2. There is direct feed of the spine rubber,
    (a) enabling control of rubber level from 1 to 99%
    (b) allowing use of rubber not soluble in monomer, i.e. non compatible feed materials
    (c) streamline operation by elimination of rubber dissolving step, i.e. no prepolymer feed.
3. Unlike certain prior processes, there is no prepolymer feed.
4. The process has the ability to handle a highly viscous system, making possible high monomer conversion, therefore allowing a wider latitude in product variation (i.e. rubber level).
5. The process makes a product which is free of residual solvents.

Referring to FIG. 1 of the drawings, a twin screw extruder-mixer device suitable for practicing the invention includes an extrusion barrel 10 having a driving mechanism 11 attached at the feed end and an exit die 12 at the discharge end. The feed end of the extruder has a hopper 13 for feeding solid rubber and, further downstream, a liquid feed inlet 14 for feeding grafting material. A port 15 for application of vacuum serves for the removal of unreacted monomers.

The extrusion barrel may be made up of a series of connected successive elements, numbered 21 to 34 in the drawing, each of which may be provided with a jacket (not shown) for circulation of a temperature control (heating or cooling) fluid.

Solid spine rubber is fed to section 21 of the extruder through the solids feed hopper 13 while, further downstream liquid monomers are fed under pressure to extruder section 23 through the liquid feed inlet 14, for example with the aid of a suitable pump (not shown).

Figure 2:
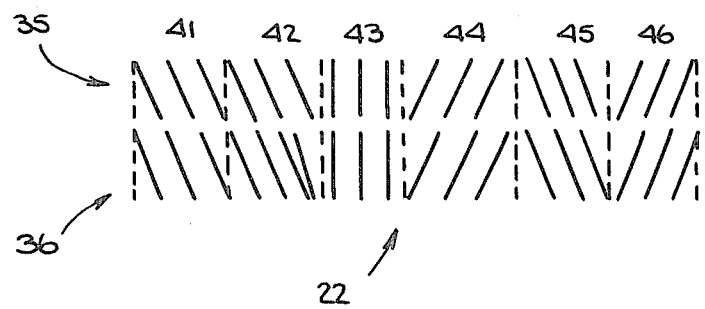
FIG. 2 is a diagrammatic plan view, on a larger scale, representing an arrangement of extruder screw elements constituting a sealing zone of the extruder.

In between the solids feed 13 and the liquid feed 14 there is located, in section 22 of the extruder, a dynamic sealing zone represented in more detail on a larger scale in FIG. 2. In the dynamic sealing zone the twin screws 35, 36 (FIG. 2) of the extruder, which corotate within the longitudinal extrusion passageway, may be divided into successive pairs of elements 41 to 46 where the pitch of the screw threads or kneading blocks is varied in such manner as to provide the desired dynamic sealing action. Thus, initial elements 41, 42 in the sealing zone are so pitched as to provide forwarding pressure on the solid rubber, and are followed by a section 43 having neutral pitch which fills up with the rubber. Thereafter there is located a section 44 having reversed (negative) pitch elements which oppose the flow of rubber, followed by a section 45 having positive (forwarding) pitch elements, and, subsequently, a section 46 having negative or reverse pitch elements which again retard or oppose the flow of rubber through the extrusion passageway.

The arrangement is such as to provide a proper balance of positive (advancing) and negative (opposing) forces to keep the dynamic sealing zone 22 filled with a plug of solid rubber while at the same time advancing the rubber through the extruder-mixer. The screw configuration in the remaining sections 23-34 of the extruder may be of conventional construction and provides a balance of positive and negative pitch elements which overcome any localized pressure buildup to maintain a steady uniform flow of material, i.e., the material is continually being thoroughly mixed.

Grafting material introduced under pressure at the liquid feed inlet 14 in section 23 downstream from the dyanamic seal section 22 becomes blended with the solid rubber in the extruder-mixer passageway.

The dynamic seal prevents the monomer from backing up or boiling away before it can be incorporated into the rubber. The mixture is raised to graft copolymerization temperature in the extrusion passageway while being worked and advanced. After removal of any unreacted monomers at vacuum port 15 in section 33 of the extruder, the graft polymerization mass passes out of the exit die 12 in the form of a strand 48 which may be pelletized in conventional manner.

In those cases where it is desirable to blend the graft copolymer with another polymer, this may be done in a separate mixing operation, or in a crosshead extruder (second extruder). As depicted in FIG. 3, a first extruder 50 having a driving mechanism 51, a solids feed hopper 52, and a liquid feed inlet 53 may be joined by a transition element 54 to a second or crosshead extruder 55. The second extruder 55 has its own driving mechanism 56 and an entrance hopper 57 for feeding solid polymer, as well as an exit die 58 from which the blended materials are discharged.

The first extruder 50 is divided into a series of elements 61-74, while the second extruder 55 is likewise constituted of a series of elements 81-94. The first extruder includes a dynamic sealing zone 62 located downstream of the element 61 bearing the solids feed entrance hopper and upstream of the element 63 where the liquid feed 53 is located. It will be understood that the dynamic sealing zone 62 of the first extruder may be constructed in the same manner as the sealing zone previously described in connection with FIG. 2. The graft copolymerization reaction proceeds in the first extruder as previously described but instead of removing the unreacted monomers the whole reaction mass is transferred through the transition zone 54 into element 84 of the second (crosshead) extruder. As before, the second extruder contains twin corotating screws. A solid polymer to be blended with the graft may be introduced at the entrance hopper 57 in the first section 81 of the crosshead extruder. Located between the section 81 of the second extruder where the polymer to be mixed is introduced, and the section 84 where the graft polymerization mass is introduced, there is again a dynamic sealing section 83 constructed as previously described. In subsequent sections 85-94 of the second extruder the added polymer and the graft are mixed together at elevated temperature. The unreacted monomers present in the graft are prevented from escaping by the dynamic seal 83, and further grafting takes place in the second extruder while the polymer and graft are being mixed. Vacuum may be applied to a port 95 near the discharge end of the second extruder to remove unreacted monomers. The final blend issues from the exit die 58 of the second extruder in the form of a strand 96.

The following examples will serve to illustrate the practice of the invention in more detail.

EXAMPLE 1

This example illustrates the preparation of graft copolymer by a mass graft copolymerization process in a twin screw extruder-mixer similar to that shown in FIGS. 1 and 2.

A 42 to 1 L/D 30 mm diameter, corotating twin-screw extruder consisting of fourteen 3 to 1 L/D barrel sections operating at 250 rpm is used with a solids feed port in the first 3 to 1 L/D section, a liquid feed port at the third 3 to 1 L/D section, and a vent port at the 13th to 1 L/D section, having five separate and distinct heating and cooling zones in the main extruder and a separate heating zone for the die which sits after the 14th 3 to 1 L/D barrel section. The temperature profile for the heating zones is as follows:

| Zone 1 | Zone 2 | Zone 3 | Zone 4 | Zone 5 | Zone 6 |
| --- | --- | --- | --- | --- | --- |
| 215° C. Barrel Section 2 | 135° C. Barrel Sections 4-6 | 155° C. Barrel Sections 7-9 | 175° C. Barrel Sections 10-11 | 210° C. Barrel Sections 12-14 | 200° C. Die |

The two feed zone barrels are neither heated nor cooled.

The extruder screw configuration is constructed so that a dynamic seal is formed between the first and third barrel sections to keep the liquid feed, which builds up a high pressure after it is injected but before it can be incorporated into the rubber, from traveling back to the solids feed port while allowing the solid feed to pass through to the liquid feed section. This is achieved by assembling a series of screw elements which counteract this pressure and set up a overall proper pressure gradient between the solid feed and liquid feed zones. The seal is constructed from six elements in series (shown schematically in FIG. 2), first two positive pitch kneading elements to provide forwarding pressure, then a neutral kneading element which has neutral pitch and tends to fill up with material. These three elements are followed by a negative or reversed pitch kneading element which opposes the flow of material from the solid to liquid feed port then a positive and finally another negative pitch kneading element. The proper balance of positive and negative forces keeps the elements full and material flowing in the appropriate direction.

For example, the first two positive pitch elements (41 and 42 in FIG. 2) may comprise kneading blocks described by the expression $$\frac{KB\ 45}{5(20)},$$

meaning that the bocks (discs) have an angle of 45° between each successive one, and that there are five discs with a total length of 20 mm. The neutral kneading element 43 may comprise for example blocks described by the expression $$\frac{KB\ 90}{5(28)},$$

meaning that there are 5 discs have an angle of 90° between each successive disc, and having a total length of 28 mm. The negative or reversed pitch element may for example comprise a kneading block characterized by the expression $$\frac{KB\ 45}{5(14)_L},$$

meaning that the discs have an angle of 45° between each successive one in the opposite rotational sense to positive pitch elements, and that there are five discs with a total length of 14 mm. The next positive kneading block 45 may be as described previously for blocks 41, 42, while the final negative pitch section 46 may be for example as described for section 44.

The rest of the screw is constructed in a similar manner to provide a balance of positive and negative kneading and conveying elements which overcome any localized pressure buildup to maintain a steady uniform flow of material.

A graft useful as an impact modifier may be prepared in the described device as follows:

One part of rubber (ethylene-propylene-dicyclopentadiene terpolymer, ethylene/propylene weight ratio 66/34, Mooney viscosity 42 [ML-4 at 121° C.], iodine number 10) dusted with 0.01 part antioxidant (Irganox 1035/1093 [trademark]) is starve fed into the solids feed port by a K-tron (trademark) twin-screw feeder while 2 parts of monomer (methyl methacrylate) containing 0.005 part of initiator (di-t-butyl peroxide) is simultaneously pumped under pressure into the liquid feed port to give a total feed rate of approximately 3.5 pounds an hour. The rubber is fluxed and dynamic seal set up on the barrel section between the two feed ports and is dispersed in the monomer by high shear following its introduction at the liquid feed port. The suspension of incompatible rubber in monomer is then compatibilized through the onset of polymerization of the methyl methacrylate monomer in which at least some part of the monomer is grafted onto the rubber while the balance of monomer is homopolymerized into poly(methyl methacrylate). This polymerization proceeds to increased conversion as the material proceeds down the extruder until it reaches the vent port where any unreacted monomer is removed to be recycled into the liquid feed. The reacted material then proceeds to the die where it is extruded and pelletized.

The resulting material contains approximately 35% rubber and 65% methyl methacrylate where the methyl methacrylate is the continuous phase. This material is subsequently mixed with additional methyl methacrylate to get the desired rubber level, typically 20–23%. This can be done in any one of several plastic compounding or mixing type equipment such as a single-screw or multiple-screw extruder, or a batch mixer. In this case grafted material was mixed with Plexiglas 920 (trademark; Rohm & Haas) on a Haake Torque Rheometer (trademark) with a mixing head and cam rotors. Samples for mechanical property testing (notched Izod at room temperature and −20° F. [ft-lb/in of notch] and hardness [Rockwell R]) were cut from ⅛ inch compression molded plaques.

| | Compression Molded Notched Izod at: | | |
|---|---|---|---|
| | RT | −20° F. | Rockwell R |
| Properties at 20% Rubber | 3.1 | 2.3 | 87 |

EXAMPLE 2

The operating conditions for this example are the same as for Example 1 except that the temperature profile on the extruder has been changed as noted below:

| Zone 1 | Zone 2 | Zone 3 | Zone 4 | Zone 5 | Zone 6 |
|---|---|---|---|---|---|
| 215° C. Barrel Section 2 | 165° C. Barrel Sections 4–6 | 175° C. Barrel Sections 7–9 | 210° C. Barrel Sections 10–11 | 210° C. Barrel Sections 12–14 | 200° C. Die |

The same procedure is used except the monomeric material is SAN (mixture of styrene and acrylonitrile) at a 67/33 styrene/acrylonitrile ratio, in place of methyl methacrylate; the total feed rate is approximately 5 pounds per hour. Dow Tyril 880 (trademark) SAN copolymer is used as the subsequently blended resinous material.

| | Compression Molded Notched Izod at: | | |
|---|---|---|---|
| | RT | −20° F. | Rockwell R |
| Properties at 23% Rubber | 7.1 | 2.2 | 92 |

EXAMPLE 3

The operating and feed rate conditions are the same as for example 2.

The same procedure is used except that polybutadiene rubber (JSR-BR01) is substituted for the EPDM.

|                        | Compression Molded Notched Izod at: | | Rockwell R |
|------------------------|------|--------|------------|
|                        | RT   | −20° F. |           |
| Properties at 23% Rubber | 1.7  | .7     | 87         |

EXAMPLE 4

A 36 to 1 L/D, 53 mm diameter, corotating twin-screw extruder operating at 50 rpm is used with a solids feed port in the first 3 to 1 L/D section, a liquid feed port at the third 3 to 1 L/D section, and a vent port at the 11th 3 to 1 L/D section having five separate and distinct heating and cooling zones in the main extruder and a separate heating zone for the die which sits after the 12th 3 to 1 L/D barrel section. The temperature profile for the heating zones is as follows:

| Zone 1 | Zone 2 | Zone 3 | Zone 4 | Zone 5 | Zone 6 |
|--------|--------|--------|--------|--------|--------|
| 200° C. | 200° C. | 220° C. | 230° C. | 230° C. | 200° C. |
| Barrel Sections 2-4 | Barrel Sections 5-6 | Barrel Sections 7-8 | Barrel Sections 9-10 | Barrel Sections 11-12 | Die |

The solids feed zone is continuously water cooled.

The extruder screw configuration may be as described in Example 1.

One part of rubber (ethylene-propylene-dicyclopentadiene terpolymer, ethylene/propylene weight ratio 66/34, Mooney viscosity 42 [ML-4 at 121° C.], iodine number 10) dusted with 0.01 part AO (Irganox 1035/1093) is free fall starve fed into the solids feed port by a K-tron (trademark) twin screw feeder while ½ part of styrene monomer containing 0.00175 part of initiator (di-t-butyl peroxide) is simultaneously pumped under pressure into the liquid feed port for a total feed rate of 12 lbs. per hour. The rubber is fluxed and dynamic seal set up in the barrel section between the two feed ports and the monomer is incorporated by high shear following its introduction at the liquid feed port. As this mixture of monomer in rubber is polymerized at least some part of the monomer is grafted onto the rubber while the balance of monomer is homopolymerized into polystyrene. This polymerization proceeds to increased conversion as the material proceeds down the extruder until it reaches the vent port where any unreacted monomer is removed to be recycled into the liquid feed. The reacted material then proceeds to the die where it is extruded and pelletized.

The resulting material contain approximately 72% rubber and 28% of grafted and ungrafted polystyrene where the rubber is the continuous phase. This material is subsequently let down (i.e., mixed) with additional polystyrene to get the desired rubber level, typically 20-23%. This can be done in any one of several plastic compounding or mixing type equipment as delineated in Example 1.

|                        | Compression Molded Notched Izod at: | | Rockwell R |
|------------------------|------|--------|------------|
|                        | RT   | −20° F. |           |
| Properties at 23% Rubber | 2.0  | .72    | 90         |

EXAMPLE 5

A 32 to 1 L/D 34 mm diameter, counter-rotating twin-screw extruder operating at 50 rpm is used with a solids feed port in the first 4 to 1 L/D section, a liquid feed port at the third 4 to 1 L/D section, and a vent port at the 7th 4 to 1 L/D section, having seven separate and distinct heating and cooling zones in the main extruder and a separate heating zone for the die which sits after the 8th 4 to 1 L/D barrel section. The temperature profile for the heating zones is as follows:

| Zone 1 | Zone 2-3 | Zone 4-5 | Zone 6-7 | Zone 8 |
|--------|----------|----------|----------|--------|
| 215° C. Barrel Section 2 | 155° C. Barrel Sections 3-4 | 175° C. Barrel Sections 5-6 | 200° C. Barrel Sections 7-8 | 200° C. Die |

The solids feed zone is continuously water cooled.

The extruder screw configuration is constructed so that a dynamic seal is formed between the first and third barrel sections to keep the liquid feed, which builds up a high pressure after it is injected but before it can be incorporated into the rubber, from traveling back to the solids feed port while allowing the solid feed to pass through to the liquid feed section. This is achieved by assembling a series of screw elements which counteract this pressure and set up an overall proper pressure gradient between the solid feed and the liquid feed zones.

The seal may be constructed for example from 3 elements. The first compresses the solid by changing from an element which is lengthwise and crosswise open at the material input side to one which is lengthwise and crosswise closed at the material exit side. The second element is a low pitch lengthwise and crosswise closed element. This is followed by a zero pitch shearing element. The fact that the elements are lengthwise and crosswise closed creates a plug flow of sufficient forwarding pressure which prevents the liquid monomer from penetrating the seal. (Terminology defined in *Polymer Processing News,* Vol. 8, #2, 1977.)

The rest of the screw is constructed in a similar manner to maintain a steady uniform flow of material.

One part of rubber (ethylene-propylene-ENB terpolymer, ethylene/propylene weight ratio 60/40, Mooney viscosity 60 [ML-4 at 121° C.], iodine number 20) dusted with 0.01 part AO (Irganox 1035/1093) is free fall starve fed into the solids feed port by a K-tron (trademark) twin screw feeder while 1 part of styrene monomer containing 0.0080 parts of initiator (5/3 t-butylperoxyisobutyrate/di-t-butyl peroxide) are simultaneously pumped under pressure into the liquid feed port. The rubber is fluxed and dynamic seal set up in the barrel section between the two feed ports and is mixed with the monomer under shear following its introduction at the liquid feed port. As this mixture of equal parts monomer and rubber is polymerized at least some part of the monomer is grafted onto the rubber while the balance of monomer is homopolymerized into polystyrene. This polymerization proceeds to increased conversion as the material proceeds down the extruder until it reaches the vent port where any unreacted monomer is removed to be recycled into the liquid feed. The reacted material then proceeds to the die where it is extruded and pelletized.

The resulting material contain approximately 51% rubber and 49% of grafted and ungrafted polystyrene where the rubber is the continuous phase. This material could subsequently be let down with additional polystyrene to get the desired rubber level, typically 20-23%, as was done in previous examples, or be used as a thermoplastic elastomer having the following representative properties:

|  | Shore A Hardness | 100% Mod. | Tensile | Elongation at Break |
|---|---|---|---|---|
| TPE | 87 | 697 | 1019 | 203% |

EXAMPLE 6

This example illustrates the continuous production of impact modified polymer. The equipment may be the same as noted in Example 2 except that the vent may be eliminated at barrel 13 and the die may be replaced by a low shear transition piece to fit the main extruder to a crosshead extruder.

The crosshead extruder is for example a 36 to 1 L/D 53 mm diameter, corotating twin-screw extruder operating at 150 rpm with a solids feed port in the first 3 to 1 L/D section, a side feed port at the 7th 3 to 1 L/D to accept the mass graft from the main polymerizing unit, and a vent port at the 11th 3 to 1 L/D section, having five separate and distinct heating and cooling zones in main body of the extruder and a separate heating zone for the die which sits after the 12th barrel section.

The temperature profile for the heating zones is as follows:

| Zone 1 | Zone 2 | Zone 3 | Zone 4 | Zone 5 | Zone 6 |
|---|---|---|---|---|---|
| 320° C. | 360° C. | 400° C. | 380° C. | 380° C. | 400° C. |
| Barrel Sections 2-4 | Barrel Sections 5-6 | Barrel Sections 7-8 | Barrel Sections 9-10 | Barrel Sections 11-12 | Die |

Barrel 1 was neither heated nor cooled.

The screw is constructed with dyanamic seal between barrel sections 5 and 7, and the same positive and negative kneading and conveying elements are used to provide the same steady uniform flow of material as in the main polymerization unit.

The graft is prepared in the same way as Example 2 except that (1) total rate is 10.6 lb/hr. and (2) unreacted monomer is not removed at barrel 13 and the material is transferred to the crosshead extruder rather than stranded and chopped.

Simultaneous to the graft being transferred to the crosshead extruder, separately polymerized SAN copolymer is being added to the solids feed port in the first barrel section in an amount necessary to bring the final product down to the desired rubber level (20-23%). The SAN fluxes in the dynamic seal set up in the barrel section between the two feed ports and mixes with the graft introduced at the side feed port. As the materials travel down the extruder, the graft continues to polymerize while simultaneously being mixed with the separately polymerized SAN copolymer until it reaches the vent port where any unreacted monomer is removed to be recycled into the liquid feed. The final polymer proceeds to the die where it is extruded and pelletized.

The resulting material is a finished product with the following properties:

|  | Compression Molded Notched Izod at: | | Rockwell R |
|---|---|---|---|
|  | RT | −20° F. |  |
| Properties at 23% Rubber | 8.65 | 2.60 | 90 |

I claim:

1. A process for graft copolymerizing material onto a rubber spine comprising continuously feeding the rubber spine into the input zone of an extrusion passageway which is incompletely filled with the rubber spine; advancing the rubber spine into and through a sealing zone of the extrusion passageway; locally retarding the flow of the rubber spine in the sealing zone and compacting the rubber spine in the sealing zone so as to completely fill the extrusion passageway with the rubber spine whereby a solid plug of the rubber spine is formed in the sealing zone; further advancing the rubber spine into and through a reaction zone of the extrusion passageway; reacting grafting material with the advancing rubber spine in said reaction zone to form a graft copolymerization mixture which is continuously kneaded under graft copolymerization conditions, and thereafter expelling the resulting graft copolymerized mass from the extrusion passageway.

2. A process as in claim 1 in which the rubber spine is EPDM or polybutadiene and the grafting material is at least one vinyl aromatic monomer, alkenoic monomer, or mixture thereof.

3. A process as in claim 1 in which the rubber spine is EPDM and the grafting material is a mixture of styrene and acrylonitrile.

4. A process as in claim 1 in which, prior to expelling the graft copolymerized mass from the extrusion passageway, vacuum is applied to remove unreacted monomers.

5. A process as in claim 1 in which the extrusion passageway contains twin extrusion screws.

6. A process as in claim 1 in which the extrusion passageway contains twin corotating screws.

7. A process as in claim 1 in which the grafting material introduced to the extrusion passageway contains a free radical polymerization initiator.

8. A process as in claim 1 in which the rubber spine contains an antioxidant.

9. A process as in claim 5 or 6 in which the sealing zone has a first section wherein positive pitch elements on the extrusion screws provide forwarding pressure, followed by a section having elements with neutral pitch which fill up with the rubber spine, and thereafter a section having reversed pitch elements which oppose the flow of rubber, followed by a further section having positive pitch elements to advance the rubber, and thereafter a further section having negative pitch elements to retard the flow of rubber.

10. A process as in claim 1 in which the graft copolymerization mixture initially comprises a dispersion of normally incompatible rubber in grafting material, which is subjected to graft copolymerization temperature whereby at least a portion of the monomers become grafted on the rubber and the rubber thus becomes compatibilized, a remaining portion of the monomers copolymerizing with each other to form a resin.

11. The product of claim 1.

* * * * *